United States Patent [19]
Cruzen

[11] 4,354,804
[45] Oct. 19, 1982

[54] COMPOSITE TURBINE WHEEL, METHOD OF MANUFACTURE AND FIXTURE THEREFOR

[75] Inventor: Gerald S. Cruzen, Gregory, Mich.

[73] Assignee: Williams Research Corporation, Walled Lake, Mich.

[21] Appl. No.: 99,005

[22] Filed: Nov. 30, 1979

[51] Int. Cl.$^3$ .......................... F01D 5/28; F04D 29/26
[52] U.S. Cl. .................................................. 416/230
[58] Field of Search ..................... 416/230, 229, 241 A

[56] References Cited

U.S. PATENT DOCUMENTS

| | | | |
|---|---|---|---|
| 3,321,019 | 5/1967 | Dmitroff et al. | 416/229 |
| 3,456,917 | 7/1969 | Palfreyman et al. | 416/230 |
| 3,602,608 | 8/1971 | Morley | 416/230 |
| 3,632,460 | 1/1972 | Palfreyman et al. | 416/230 |
| 3,645,829 | 2/1972 | Palfreyman | 416/230 |
| 3,737,250 | 6/1973 | Pilpel | 416/230 |
| 3,883,267 | 5/1975 | Baudier | 416/230 |
| 4,046,489 | 9/1977 | Fairchild | 416/230 |

FOREIGN PATENT DOCUMENTS 2024939  3/1971  Fed. Rep. of Germany ...... 416/230

*Primary Examiner*—William L. Freeh
*Attorney, Agent, or Firm*—Lyman R. Lyon

[57] ABSTRACT

A turbine wheel made up of a hub having carbon cloth discs impregnated with a carbon bearing resin, integral blades formed of chopped carbon fibers impregnated with the resin, and continuous carbon strengthening fibers in the hub and blades which extend circumferentially around the hub and radially through the blades to provide maximum strength. The method of manufacture comprises providing a fixture having slotted tip and root section template rings and aft and forward plates, alternately laying cloth discs within the inner ring and threading carbon fibers in and then out of the templates, adding chopped carbon fibers between the templates, impregnating the material with a carbon bearing resin, densifying the wheel by chemical vapor deposition, and machining the blades around the radial portions of the threaded carbon fibers.

6 Claims, 9 Drawing Figures

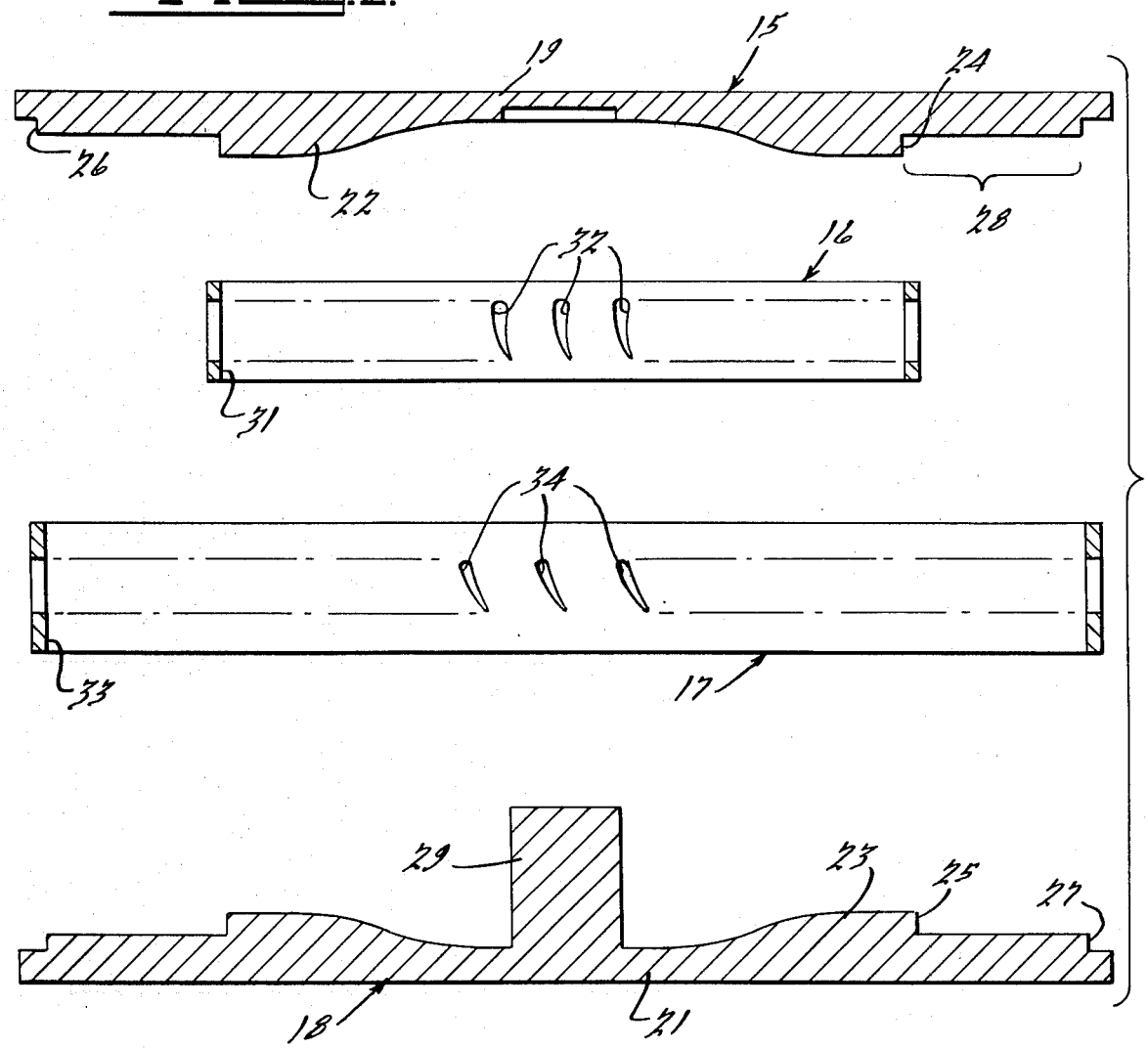
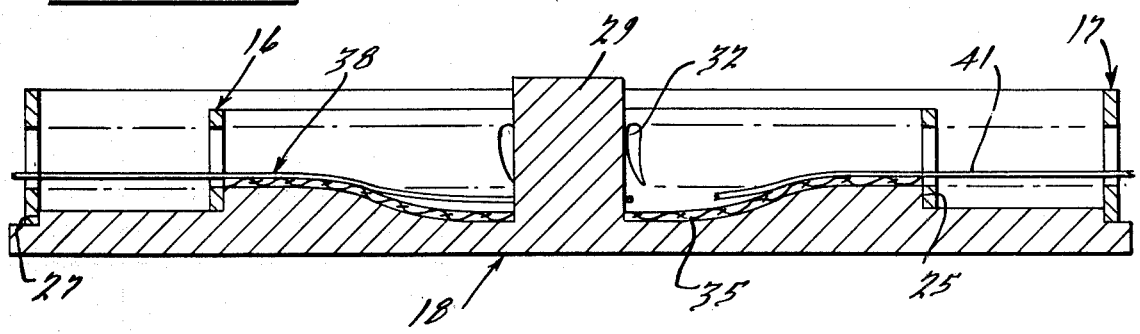

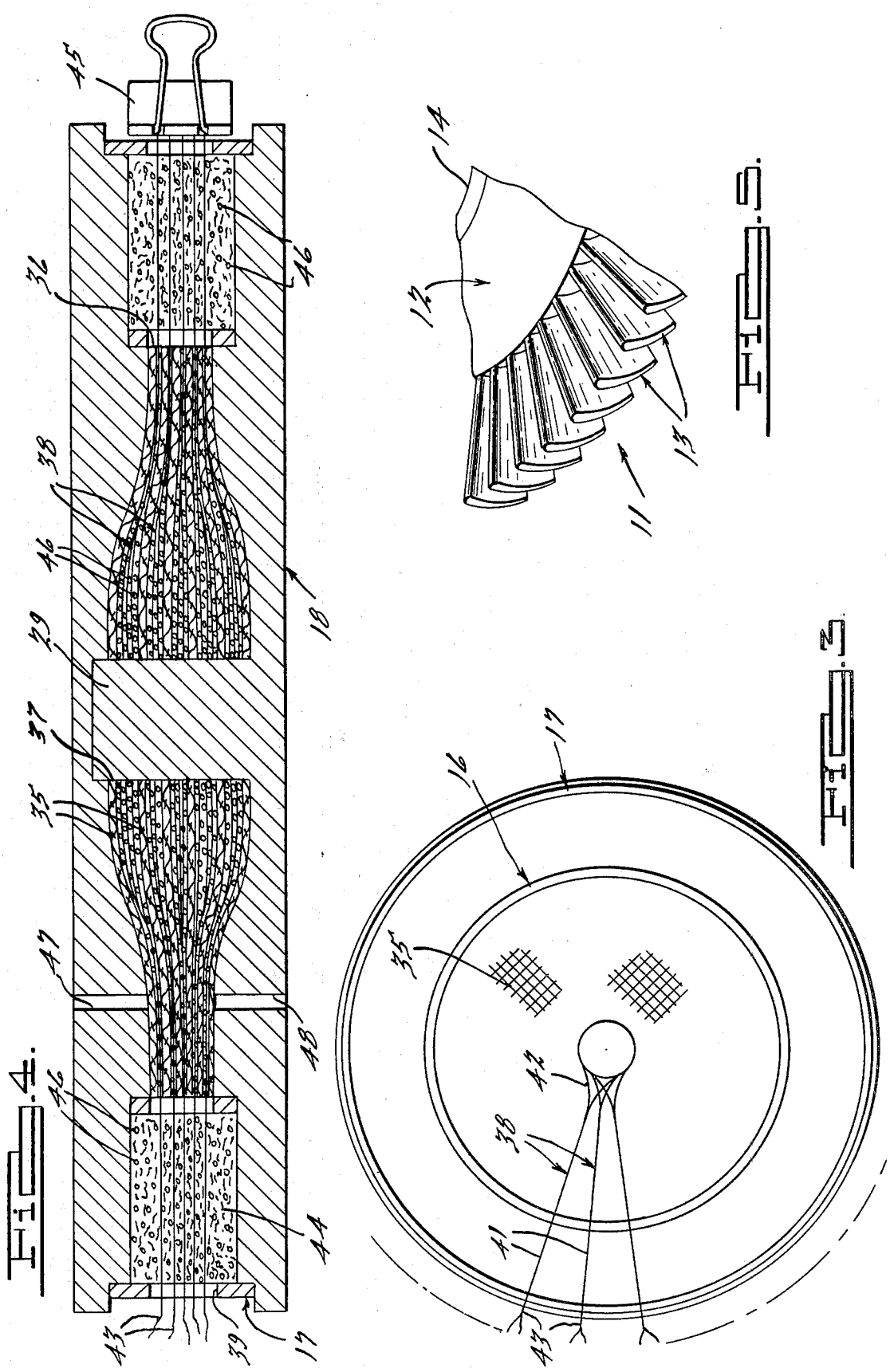

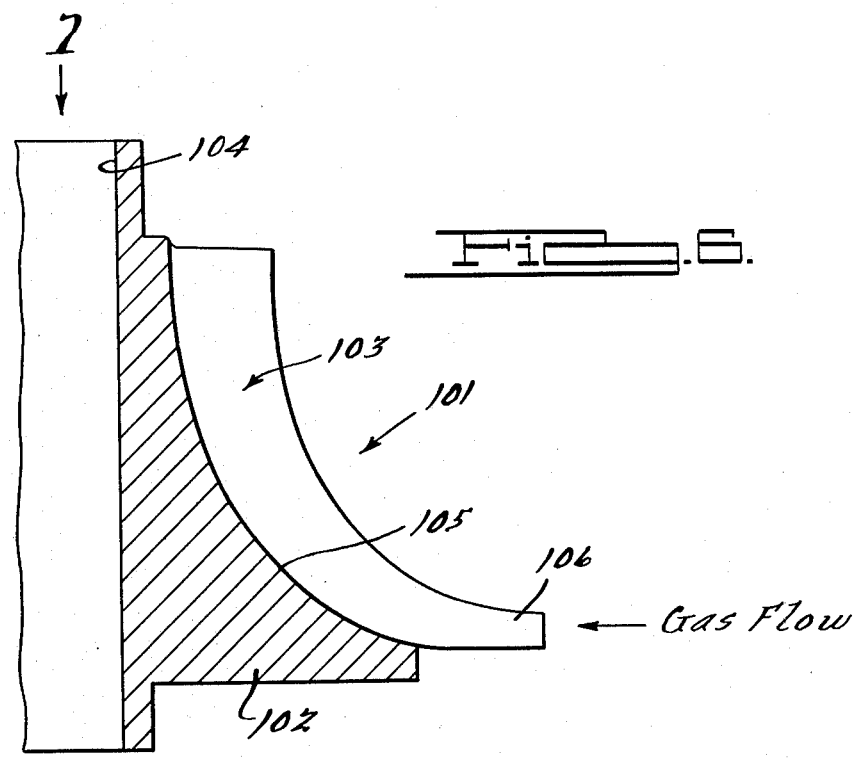
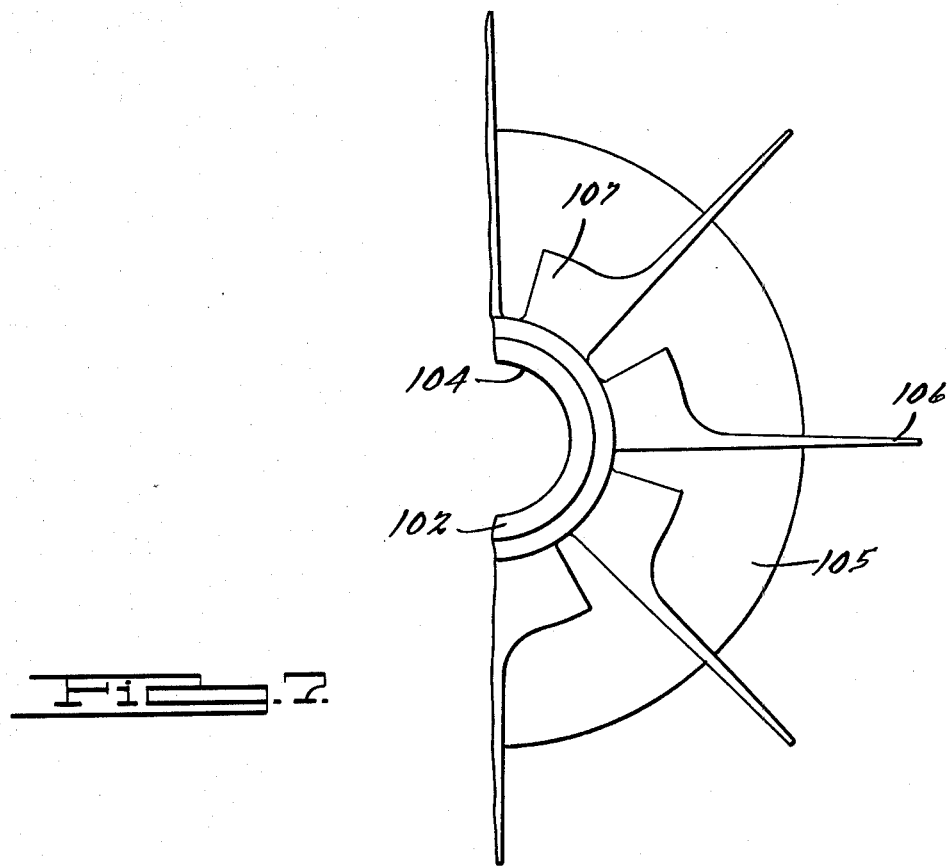

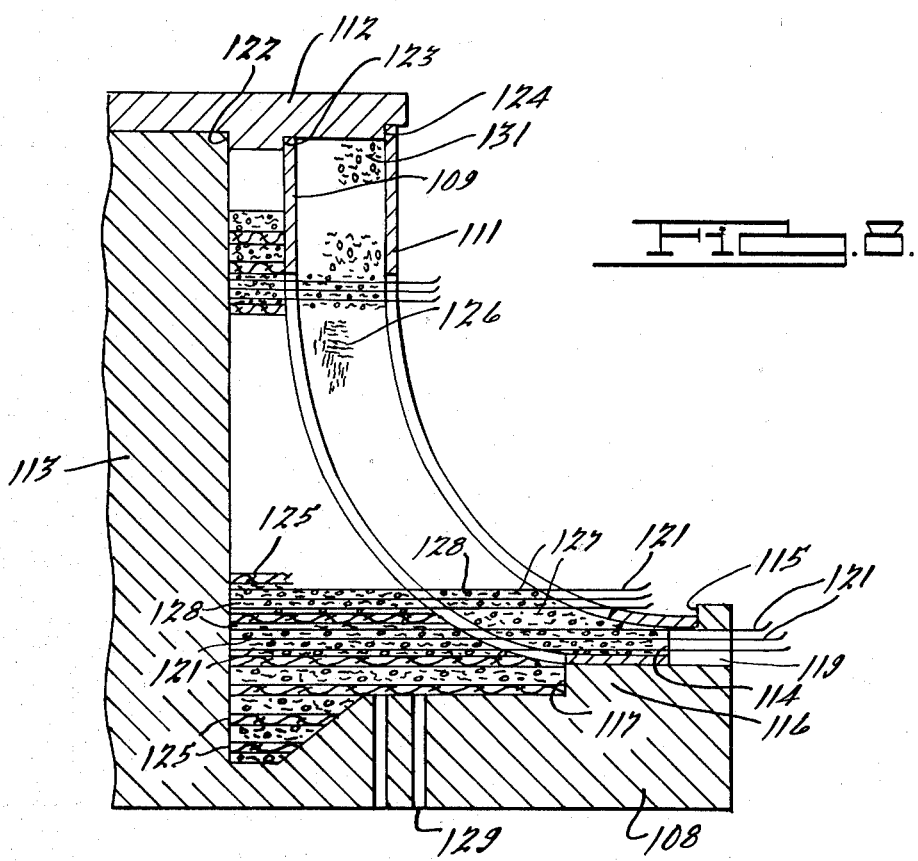
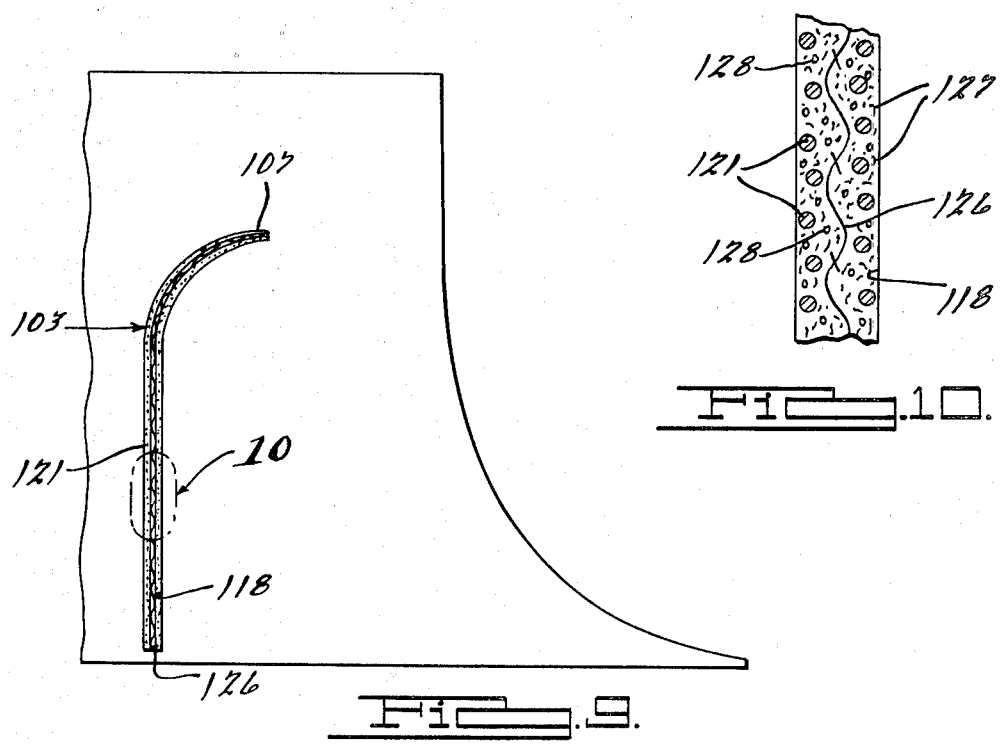

COMPOSITE TURBINE WHEEL, METHOD OF MANUFACTURE AND FIXTURE THEREFOR

BACKGROUND OF THE INVENTION

1. Field of the Invention

The invention relates to the fabrication of gas turbine engine wheels which are a composite of carbon cloth, chopped carbon fibers, carbon bearing resin and elongated carbon fibers extending continuously through the hub and blades.

2. Description of the Prior Art

It is desirable for the efficiency of a gas turbine engine to have the combustion gas temperature at the maximum level that the turbine and nozzle structures can withstand. Currently, metal turbine wheels permit a maximum turbine inlet temperature of approximately 2000° F. An increase in this temperature requires use of advanced materials such as ceramics or carbon. The maximum useful service temperature of carbon, when coated, is approximately 6000° F. However, in block or disc form, it has an absolute strength which is well below requirements. Filament or fiber forms of carbon, on the other hand, have a high tensile strength, perhaps double or triple that of metals. A solution to the low strength problem is thus to weave carbon fibers into cloth which is then laid up in disc shape and densified by chemical vapor deposition of carbon. This type of structure is known as a carbon/carbon composite.

A major problem associated with the manufacture of such composite turbine wheels is that of orienting the carbon strengthening fibers so that they will carry most of the centrifugal and thermal stresses generated in the bladed turbine wheel. In the blade and neck area of the wheel it is desirable to have a radial orientation of the fibers because of the nature of the stresses. However in the bore or hub area a circumferential orientation of the fibers is preferable. There is presently no known procedure for accomplishing this overall construction.

The second problem with the carbon/carbon composite turbine wheels is that the blades have a complex airfoil shape which must be machined into the periphery of the disc without severing any of the carbon strengthening fibers. If cut, the fibers lose their strength and the resulting wheel may be unsuitable for use. No presently known procedure exists for allowing the blades to be machined without severing fibers.

It is known to manufacture composite structures such as fiberglass reinforced plastics utilizing the tensile strength of filaments in the blades of compressor rotors. It is also known to use a combination of amorphous carbon plus carbon filaments in such products as aircraft brake discs, turbine impellers and re-entry heat shields.

BRIEF SUMMARY OF THE INVENTION

It is an object to the invention to provide a novel and improved turbine wheel, method of manufacture and fixture therefor which overcomes the deficiencies and drawbacks discussed above and orients the carbon strengthening fibers in each portion of the turbine wheel to achieve maximum strength.

It is a further object to provide an improved turbine wheel, method and fixture of this nature which permits the complex airfoil shapes to be machined into the turbine blade without severing any of the carbon strengthening fibers.

It is another object to provide a novel and improved fixture for manufacturing a carbon/carbon turbine wheel which insures that the fibers represent a continuous load carrying path from the blade tips to and around the wheel hub and which enables the manufacturing to be accomplished in a simple and economical manner.

Other objects, features and advantages will become apparent from the following description, the appended claims and the attached drawings.

Briefly, the turbine wheel of this invention comprises a hub having layers of woven carbon cloth discs impregnated with carbon bearing resin, and turbine blades formed of carbon bearing resin and carbon reinforcing fibers, at least some of the fibers extending radially through a blade, then circumferentially at least part way around the hub. Preferably, the fibers extend back through a blade in a continuous manner.

The method of this invention briefly comprises the steps of building up the hub portion of the turbine wheel with layers of woven carbon cloth discs alternating with carbon fibers wound circumferentially at least part way around the hub portion and extending radially in the blade portion of the wheel, the radial portions of the carbon fibers being placed only in the spaces to be occupied by the blades, impregnating both the hub and blade portions of the wheel with carbon bearing resin, and machining the blades around the carbon fibers.

In still another aspect, the fixture of this invention briefly comprises a forward plate and an aft plate having the desired contours of the forward and aft faces of the turbine wheel, and shoulders defining the desired root and tip diameters, a central post the size of the desired bore diameter, a root section template ring fitting on said root diameter shoulders and having apertures with the desired root section airfoil shapes, and a tip section template ring fitting on said tip diameter shoulders and having apertures with the desired tip section airfoil shapes, the two rings being fabricated of material which may be machined away during fabrication of the turbine wheel blades.

BRIEF DESCRIPTION OF THE DRAWINGS

FIG. 1 is an exploded view of the fixture elements for manufacturing an axial flow turbine wheel;

FIG. 2 is a view showing the aft plate, root section and tip section template rings assembled together with woven carbon cloth discs and carbon fibers placed therein;

FIG. 3 is a top plan view showing the manner in which the carbon fibers are placed in the fixture;

FIG. 4 is a schematic cross sectional view in elevation showing the composite carbon/carbon turbine wheel being formed within the fixture;

FIG. 5 is a perspective view of the turbine wheel, parts being broken away, showing the machined blades;

FIG. 6 is a partial cross sectional view showing the construction of a radial inflow "star" wheel or gas turbine rotor which may be manufactured in accordance with the invention;

FIG. 7 is a partial end view of the turbine wheel of FIG. 6 taken in the direction of the arrow 7 thereof;

FIG. 8 is a schematic partial cross sectional view in elevation showing the radial inflow turbine wheel being formed within a fixture therefor;

FIG. 9 is a cross sectional view of a single blade showing the components therein, and FIG. 10 is an enlarged view of a portion of FIG. 9 taken in the area 10 thereof to further illustrate the blade components.

DESCRIPTION OF THE PREFERRED EMBODIMENTS

FIG. 5 shows a typical carbon/carbon composite axial flow turbine rotor of the type which the present invention is capable of manufacturing. The rotor is generally indicated at 11 and comprises a hub generally indicated at 12 and turbine blades generally indicated at 13 integrally formed therewith. The hub may have any desired cross sectional shape and is shown as being thicker toward the center and tapering to a thinner section in an outward direction. A central shaft bore 14 is formed in the hub. It will be noted that the blades have a complex airfoil shape, with a root section which is decidedly different than the tip section. An object of the invention is to machine these airfoil shapes without severing the carbon fibers extending through the blades.

The fixture of this invention is shown best in FIGS. 1, 2 and 4 and comprises a forward plate generally indicated at 15, a root section template ring generally indicated at 16, a tip section template ring generally indicated at 17 and an aft plate generally indicated at 18. The forward and aft plates are quite similar in construction, both being fabricated as circular metal plates, preferably of tool steel, with their facing portions having machined into them the desired contours of the forward and aft faces of the turbine wheel. More particularly, the central sections 19 and 21 of these two plates are relatively thin, but they gradually become thicker in the areas marked 22 and 23. These areas will define the hub of the turbine wheel, the hub being necked down adjacent the blades. Shoulders 24 and 24 are machined into the two plates to define the desired root diameter of the blades, and shoulders 26 and 27 are also formed to define the desired tip diameter. The area indicated by the bracket 28 in FIG. 1 will thus form the blade portion of the wheel, from which the blades will later be machined, it being noted that this area is somewhat thicker before machining than the adjacent area of the hub itself. Aft plate 18 is also provided with a post 29 to define the desired diameter of the bore 14.

Root section template ring 16 comprises a sheet metal ring having an inner diameter 31 which fits shoulders 24 and 24. The axial length of ring 16 is such as to create the proper thickness of area 28 when the fixture parts are assembled. Apertures in the form of root section airfoil shapes 32 penetrate ring 16 at appropriate intervals.

Similarly, tip section template ring 17 is fabricated of low carbon steel and has an inner diameter 33 fitting shoulders 26 and 27. This ring has apertures 34 of the desired tip section airfoil shape. Both rings 16 and 17 will be expended during the later processing steps; two new rings are required for each wheel made.

Carbon cloth having a desired weave geometry, both circumferential and radial, is cut into the shape of discs 35 whose outer diameters 36 are equal to the desired hub section outer diameter. The inner diameters 37 of discs 35 are equal to the desired diameter of bore 14. A sufficient number of these discs must be fabricated, keeping in mind the desired axial thickness of the wheel.

Fixture parts 16, 17 and 18 are then assembled as shown in FIG. 2. A first carbon cloth disc 35 is placed inside ring 16 and pressed downwardly into place on post 29 and against the contoured surface of aft plate 18. Carbon fibers generally indicated at 38 are then threaded through the tip section and root section template rings at the blade trailing edge, indicated at 39 in FIG. 4, wound once around the center post and rethreaded through the same blade apertures, as indicated in FIG. 3. In this figure, the reference numeral 41 indicates those portions of the carbon fiber which extend twice through the blade apertures, while reference numeral 42 refers to the circumferential portion of the fiber wrapped around post 29. It will be noted that the transition from radial to circumferential is a smooth one. Portions 43 of the fibers are allowed to extend beyond template ring 17 so as to be accessible to the operator.

A second carbon cloth disc 35 is then placed in the fixture as before and the winding procedure is repeated. After each carbon disc is placed in position, enough carbon fibers will be threaded through the template rings to manufacture all the blades. Alternatively, other threading sequences could be followed to suit requirements. In this manner the wheel is built up to its desired full thickness.

Chopped carbon fibers 44 are then poured into the annular space 28 between rings 16 and 17 until this space is filled. The entire fixture is then agitated to make sure that the chopped carbon fibers fill the spaces between carbon fiber portions 41. The slack fibers 38 are then drawn snug by grasping their outer portions 43 and holding them by such means as metal clips 45. Forward plate 15 is then pressed downwardly into place until its shoulders 24 and 26 fit into rings 16 and 17 respectively.

A carbon bearing resin indicated at 46 is then used to impregnate the turbine wheel. This resin may be injected through small holes in plates 15 and 18, such as those indicated at 47 and 48 in FIG. 4. The impregnation is preferably continued until both the carbon cloth 35 in the chopped carbon fibers 44 are saturated. A heating cycle is then used to drive off the volatiles, leaving a carbon matrix bonding the fibers together and rigidifying the carbon fibers and cloth.

As the next step in the method, plates 15 and 18 are removed from the assembly. The wheel is preferably subjected to a series of conventional chemical vapor deposition cycles to bring the composite density of the product to the desired value. These cycles are of a conventional nature with penetration of the turbine wheel accomplishing the desired purpose.

Turbine blades 13 are then machined from the reinforced densified chopped carbon fibers 44. In carrying out this step by conventional milling or another machining method, it is possible to avoid severing any of the radial fiber portions 41 that extend through the blades and tie the blades to the wheel, since the carbon fibers are aligned in the shape of the blade airfoils. To insure this, it may be required to place index marks on the outside of ring 17 before machining. During the machining process, rings 16 and 18 will be machined away.

The result of this procedure will be a turbine wheel having circumferential carbon fibers near the wheel bore, radial fibers in the wheel neck and blade areas, and a smooth transition area in between. The fibers will thus be aligned in the direction most beneficial for carrying loads. Additionally, the load carrying path will be uninterrupted between the blade tips and the wheel bore.

FIGS. 6 through 10 show the invention as applied to a radial inflow or "star" wheel type of turbine rotor. This type of rotor could in some circumstances be more efficient at the high temperatures for which a carbon/carbon turbine wheel is needed. The turbine wheel is generally indicated at 101 and comprises a hub 102 and turbine blades generally indicated at 103. Hub 102 has a central bore 104, and the outer portion of the hub is of convex shape as indicated at 105. The blades 103 are curved to fit this convex shape, with an entrance portion 106 toward which the gas flows, and exit portions 107 as seen in FIG. 7.

In fabricating a carbon/carbon turbine wheel as shown in FIGS. 6 and 7, the fixture comprises a forward plate 108, a root section template ring 109, a tip section template ring 111 and an aft plate 112. Except for the fact that these plates are differently shaped, their general function and construction would be the same as the corresponding parts of the previous embodiment. Forward plate 108 is provided with a post 113 to define bore 104, a first shoulder 114 for template 109, and a second shoulder 115 for template 111. The forward plate is also provided with a section 116 to provide for the fact that the hub does not extend to the ends 106 of blades 103, this portion 116 being connected to the inner portion of the forward plate by a shoulder 117.

Templates 109 and 111 are formed with slots or apertures such as that indicated at 118 in FIG. 9 corresponding to the desired root and tip sections of the blade shape. Slots 119 are also provided in the outer portion of forward plate 108 to permit carbon fibers 121 to extend through portions 106 of the blades and outwardly from the plate so that they may be clamped as described with respect to the previous embodiment.

Aft plate 112 is provided with a recess 122 for the top of post 113, and shoulders 123 and 124 for templates 109 and 111 respectively.

The method of fabricating turbine wheel 101 is similar to that of the previous embodiment. Carbon cloth discs 125 and radial carbon reinforcing fibers 121 are placed in position on post 113. It should be noted that the first group of cloth discs and radial fibers do not extend through slots in the root and tip section templates. However, after sufficient discs and reinforcing fibers have been placed in position, the level will be built up to where the carbon fibers can be passed through the apertures in the templates and through slots 119. The threading of the fibers will be analogous to that described with respect to the previous embodiment, that is, they will preferably pass twice through each slot and around post 113.

As shown particularly in FIGS. 9 and 10, this embodiment of the invention has an additional feature as compared with the first embodiment, namely, use of pieces of carbon cloth 126 which are cut to the shape of each blade and are captured between the rows of radially extending carbon fibers 121. Cloth pieces 126 are not contiguous with the cloth discs 125 but are rather separate pieces which extend transversely to the cloth discs.

After the wheel has been built up, chopped carbon fibers 127 are poured into the annular space between templates 109 and 111 and the fixture agitated as described above. The slack fibers 121 are then drawn snug and plate 112 pressed into place. A carbon bearing resin 128 is then used to impregnate the entire turbine wheel, both the blade and hub sections. The resin may be injected through small holes such as those indicated at 129. The space 131 above the blades may also be filled with chopped carbon fibers and resin.

After impregnation, a heating cycle will leave the carbon matrix in the condition described with respect to the previous embodiment. After removal of plates 108 and 112, and chemical vapor deposition cycles, turbine blades 103 will be machined from the reinforced densified chopped carbon fibers 127. As in the previous embodiment, radial fibers 121 which extend through the blades and tie into the wheel will not be severed.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

I claim:

1. A turbine wheel comprising a hub having layers of woven carbon cloth discs impregnated with carbon bearing resin, and turbine blades formed of carbon bearing resin and carbon reinforcing fibers, at least some of the fibers extending radially through a blade, then circumferentially at least part way around the hub and back through a blade in a continuous manner, said turbine blades also comprising chopped carbon fiber fillers impregnated by said carbon bearing resin.

2. A turbine wheel according to claim 1, said turbine blades also comprising cloth pieces cut to the blade shape and captured between rows of said carbon reinforcing fibers.

3. A turbine wheel according to claim 1 wherein said some of said fibers extend circumferentially approximately 180° around said hub.

4. A turbine wheel according to claim 1, said turbine blades also comprising cloth pieces cut to the blade shape and captured between rows of said carbon reinforcing fibers.

5. A turbine wheel according to claim 4, said turbine blades also comprising cloth pieces cut to the blade shape and captured between rows of said carbon reinforcing fibers.

6. A turbine wheel according to claim 5, said turbine blades also comprising cloth pieces cut to the blade shape and captured between rows of said carbon reinforcing fibers.

* * * * *